(12) United States Patent
Huggins et al.

(10) Patent No.: US 11,126,804 B2
(45) Date of Patent: Sep. 21, 2021

(54) SYSTEMS AND METHODS FOR SELECTIVELY ENABLING THE OPERATION OF A DEVICE

(71) Applicant: TECHTRONIC CORDLESS GP, Anderson, SC (US)

(72) Inventors: Mark Huggins, Anderson, SC (US); Tyler J. Rowe, Anderson, SC (US); Frederick W. Bryan, Greenville, SC (US); Gian S. E. Thomas, Greenville, SC (US); Mark K. Stokes, Clemson, SC (US); William M. McNabb, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 16/532,619

(22) Filed: Aug. 6, 2019

(65) Prior Publication Data

US 2020/0042753 A1   Feb. 6, 2020

Related U.S. Application Data

(60) Provisional application No. 62/714,934, filed on Aug. 6, 2018.

(51) Int. Cl.
*G06K 7/08* (2006.01)
*G06K 7/10* (2006.01)
*H05K 5/00* (2006.01)

(52) U.S. Cl.
CPC ....... *G06K 7/10297* (2013.01); *H05K 5/0017* (2013.01)

(58) Field of Classification Search
CPC . G06K 19/0723; G06K 7/0008; G06Q 20/341
(Continued)

(56) References Cited

U.S. PATENT DOCUMENTS

| 5,481,178 A | 1/1996 | Wilcox et al. |
| 6,211,649 B1 | 4/2001 | Matsuda |

(Continued)

FOREIGN PATENT DOCUMENTS

| CN | 1592027 A | 3/2005 |
| CN | 101764417 A | 6/2010 |

(Continued)

OTHER PUBLICATIONS

Linear Technology, "LTC3553 Micropower USB Power Manager with Li-Ion Charger, LDO and Buck Regulator", Product Data Information, 2009, 36 pages.

(Continued)

*Primary Examiner* — Jamara A Franklin
(74) *Attorney, Agent, or Firm* — Michael Best & Friedrich LLP

(57) ABSTRACT

A device that includes a controller having a processing unit and a memory. The device includes an enable circuit. The enable circuit prevents the device from operating (e.g., discharging current and/or receiving charging current) until the enable circuit is activated. The enable circuit includes an activation component (e.g., a near-field communication ["NFC"] circuit). The activation component is configured or operable to cause the device to become enabled when the activation component is activated by an external enabling device.

18 Claims, 13 Drawing Sheets

(58) Field of Classification Search
USPC .............................. 235/492; 340/572.1–572.9
See application file for complete search history.

(56) References Cited

U.S. PATENT DOCUMENTS

| | | | |
|---|---|---|---|
| 6,291,966 | B1 | 9/2001 | Wendelrup et al. |
| 6,304,066 | B1 | 10/2001 | Wilcox et al. |
| 6,343,051 | B1 | 1/2002 | Yabe et al. |
| 6,403,251 | B1 | 6/2002 | Baggaley et al. |
| 6,522,118 | B1 | 2/2003 | Barcelo et al. |
| 6,570,372 | B2 | 5/2003 | Barcelo et al. |
| 6,580,258 | B2 | 6/2003 | Wilcox et al. |
| 6,657,415 | B2 | 12/2003 | Saeki et al. |
| 6,700,364 | B2 | 3/2004 | Barcelo et al. |
| 6,814,005 | B1 | 11/2004 | Vestre |
| 6,850,041 | B2 | 2/2005 | Takano |
| 7,026,790 | B2 | 4/2006 | Kim et al. |
| 7,495,416 | B2 | 2/2009 | Sato et al. |
| 7,511,390 | B1 | 3/2009 | Walter |
| 7,579,811 | B2 | 8/2009 | Sato et al. |
| 7,592,780 | B2 | 9/2009 | Funabashi et al. |
| 7,629,769 | B2 | 12/2009 | Gangstoe et al. |
| 7,728,553 | B2 | 6/2010 | Carrier et al. |
| 7,755,500 | B2 | 7/2010 | Densham et al. |
| 7,825,627 | B2 | 11/2010 | Bucur |
| 8,030,893 | B2 | 10/2011 | Nakatsuji |
| 8,138,722 | B2 | 3/2012 | Wang et al. |
| 8,154,255 | B2 | 4/2012 | Wang et al. |
| 8,169,298 | B2 | 5/2012 | Wiesner et al. |
| 8,339,107 | B2 | 12/2012 | Ikeuchi et al. |
| 8,381,829 | B2 | 2/2013 | Hanawa et al. |
| 8,471,532 | B2 | 6/2013 | Johnson et al. |
| 8,664,913 | B2 | 3/2014 | Chuan et al. |
| 8,723,482 | B2 | 5/2014 | Dao et al. |
| 8,766,599 | B2 | 7/2014 | Kim |
| 8,796,996 | B2 | 8/2014 | Nakatsuji et al. |
| 8,802,257 | B2 | 8/2014 | Kim et al. |
| 8,860,373 | B2 | 10/2014 | Saito |
| 8,880,916 | B2 | 11/2014 | Li |
| 8,943,335 | B2 | 1/2015 | Holsen et al. |
| 8,996,324 | B2 | 3/2015 | Majima et al. |
| 9,203,249 | B2 | 12/2015 | Noda et al. |
| 9,337,667 | B2 | 5/2016 | Arendell |
| 9,780,583 | B2 | 10/2017 | Furui et al. |
| 9,893,547 | B2 | 2/2018 | Wu et al. |
| 9,917,451 | B2 | 3/2018 | Kim |
| 10,003,205 | B2 | 6/2018 | Kaji et al. |
| 10,084,212 | B2 | 9/2018 | Liao et al. |
| 10,124,455 | B2 | 11/2018 | Ito et al. |
| 10,211,655 | B2 | 2/2019 | Wu et al. |
| 2002/0101218 | A1 | 8/2002 | Koenck et al. |
| 2007/0074025 | A1 | 3/2007 | Baek et al. |
| 2008/0224873 | A1* | 9/2008 | Yeo ............... G06K 7/0008 340/572.4 |
| 2016/0075254 | A1 | 3/2016 | Chang et al. |
| 2016/0226278 | A1 | 8/2016 | Wenger et al. |
| 2018/0152035 | A1 | 5/2018 | Li |
| 2018/0262025 | A1 | 9/2018 | Stewart et al. |
| 2019/0097435 | A9 | 3/2019 | Stewart et al. |

FOREIGN PATENT DOCUMENTS

| | | |
|---|---|---|
| CN | 201985580 U | 9/2011 |
| CN | 202326312 U | 7/2012 |
| CN | 103809777 A | 5/2014 |
| CN | 104094496 A | 10/2014 |
| CN | 105490335 A | 4/2016 |
| CN | 105529771 A | 4/2016 |
| CN | 205441163 U | 8/2016 |
| CN | 106254686 A | 12/2016 |
| CN | 106787133 A | 5/2017 |
| CN | 106787134 A | 5/2017 |
| CN | 208581081 U | 3/2019 |
| CN | 208707379 U | 4/2019 |
| WO | 2011107119 A1 | 9/2011 |
| WO | 2016200872 A1 | 12/2016 |
| WO | 2017006125 A1 | 1/2017 |

OTHER PUBLICATIONS

Texas Instruments, "Integrated Switch-Mode One-Cell Li-Ion Charger with Full USB Compliance", Product Data Information, Feb. 2010, 34 pages.

Texas Instruments, "Fully Integrated Switch-Mode One-Cell Li-Ion Charger with Full USB Compliance and Accessory Power Connection", Product Information, Sep. 2010, 46 pages.

Maxim Integrated, "MAX8939/MAX8939A/MAX8939B System Power Management for Mobile Handset", Product Data Information, 2012, 45 pages.

Awodele et al., "Network Power Sharing Device: Power Sharing Via USB to power Port with Output Voltage/Current 17v-19v/4A-4.5A", Informing Science and IT Education Conference, 2008, 12 pages.

International Search Report and Written Opinion for Application No. PCT/US2019/045198 dated Nov. 22, 2019 (11 pages).

* cited by examiner

SYSTEMS AND METHODS FOR SELECTIVELY ENABLING THE OPERATION OF A DEVICE

RELATED APPLICATIONS

This application claims the benefit of U.S. Provisional Patent Application No. 62/714,934, filed Aug. 6, 2018, the entire content of which is hereby incorporated by reference.

FIELD

Embodiments described herein relate to a battery pack, a power tool, a battery pack charger, or another device.

SUMMARY

Battery packs for devices such as power tools and outdoor power products are increasingly sophisticated, powerful, and widely applicable. Battery packs are now used in a variety of applications that, in the past, would have seemed unimaginable. The expansion of the use of battery packs to new and different applications has been sparked by advances in battery technology that have allowed battery packs to produce more power with less weight. As battery technology has continued to improve, the cost of battery packs has remained relatively high. As a result of their relatively high cost, wide application, and relatively small size, battery packs have become a common target of retail theft. In order to prevent or mitigate the likelihood that a battery pack or other related device (e.g., power tool, charger, etc.) will be stolen from an authorized retailer, the battery pack and other devices can be equipped with an enable circuit.

The enable circuit can, for example, prevent a device from operating (e.g., discharging current, receiving charging current, driving a motor, outputting charging current, etc.). The enable circuit must be activated in order to cause the device to switch from a disabled mode to an enabled mode. The enable circuit can include an activation component (e.g., a controller) that is activated by, for example, a magnetic tag deactivation scanner (e.g., such as a Sensormatic® scanner used in the checkout line of a store), a radio-frequency identification ("RFID") tag reader, or a near-field communication ("NFC") circuit.

In some embodiments, after the activation component of the enable circuit is activated, the circuit causes a fuse to be opened. After the fuse is opened, the device has been enabled and is capable of, for example, discharging current and/or receiving charging current. In other embodiments, enablement of the device depends upon the state of an inventory control tag (e.g., the deactivation of the inventory control tag). The enable circuit monitors for the inventory control tag (e.g., a Sensormatic magnetic tag) to be deactivated (e.g., by detecting the presence or absence of a magnetic field from the tag). Based on this monitoring, the enable circuit can enable the operation of the battery pack.

Embodiments described herein provide a device that includes an enable circuit. The device, a housing, a controller, and an enable circuit. The controller is located within the housing. The controller includes a processing unit and a memory. The controller is configured to selectively prevent the operation of the device. The enable circuit is located within the housing. The enable circuit is configured to receive a signal related to enabling operation of the device. The signal is operable to cause the device to change from a disabled state, during which the device is prevented from operating, to an enabled state, during which the device is permitted to operate.

Embodiments described herein provide a system for enabling one or more devices. The system includes an enabling device and a device. The enabling device is configured to generate a signal, and the enabling device is associated with a retailer. The device includes a housing, a controller, and an enable circuit. The controller is located within the housing. The controller includes a processing unit and a memory. The controller is configured to selectively prevent the operation of the device. The enable circuit is located within the housing. The enable circuit is configured to receive the signal from the enabling device related to enabling operation of the device. The signal is operable to cause the device to change from a disabled state, during which the device is prevented from operating, to an enabled state, during which the device is permitted to operate.

Embodiments described herein provide a method of enabling a device that includes a housing, enable circuit located within the housing, and a memory located within the housing. The method including activating an enabling device, bringing the device in proximity to the enabling device, and transmitting, from the enabling device, a signal to the enable circuit related to enabling operation of the device. The signal is operable to cause the device to change from a disabled state, during which the device is prevented from operating, to an enabled state, during which the device is permitted to operate.

Embodiments described herein provide a battery pack for a power tool or an outdoor power product. The battery pack includes a housing that is connectable to and supportable by the power tool or the outdoor power product. The battery pack also includes a controller having a processor and a memory. The controller is connected to an enable circuit. The enable circuit prevents the battery pack from operating (e.g., discharging current and/or receiving charging current). The enable circuit includes an activation component and a fuse. The activation component is configured or operable to cause the fuse to be opened when the activation component is activated by an external enabling device.

Embodiments described herein provide a method of enabling a battery pack that includes a enable circuit. The method includes activating an enabling device and bringing the battery pack in proximity to the enabling device. By bringing the battery pack in proximity to the enabling device, the enable circuit is activated. By activating the enable circuit, an activation component in the enable circuit is activated. After activating the activation component, the battery pack is enabled.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein related to a device, such as a battery pack, power tool, or battery pack charger that includes an enable circuit. The enable circuit functions to convert a device from a disabled mode to an enabled mode. For example, when a battery pack is configured in the disabled mode, the enable circuit prevents the battery pack from operating (e.g., the battery pack is prevented from discharging current and/or receiving charging current). For the battery pack to become operational, the enable circuit must be activated. The enable circuit can be activated in a variety of ways. For example, the enable circuit can be activated by a magnetic tag deactivation scanner (e.g., such as the type of scanner used in the checkout line of a store). The magnetic scanner triggers an activation component (e.g., an inductor) of the enable circuit. Once the activation component is triggered, the enable circuit causes the device to switch from the disabled mode to the enabled mode, and the device is no longer prevented from discharging current and/or receiving charging current. In other embodiments, a radio-frequency identification ("RFID") tag reader or a near-field communication ("NFC") circuit is used to trigger the activation component of the enable circuit. In some embodiments, the activation component is a device controller (e.g., controller-based enablement). In other embodiments, the enable circuit includes a fuse and the activation component (e.g., a resistor). The activation component is triggered by the magnetic scanner, the RFID tag reader, or the NFC communication module to cause the fuse to be opened. When the fuse of the enable circuit is opened, the device switches from the disabled mode to the enabled mode. In other embodiments, enablement of the device depends upon the state of an inventory control tag (e.g., the deactivation of the inventory control tag). The enable circuit monitors for the inventory control tag (e.g., a Sensormatic magnetic tag) to be deactivated (e.g., by detecting the presence or absence of a magnetic field from the tag). Based on this monitoring, the enable circuit can enable the operation of the device.

Figure 1:
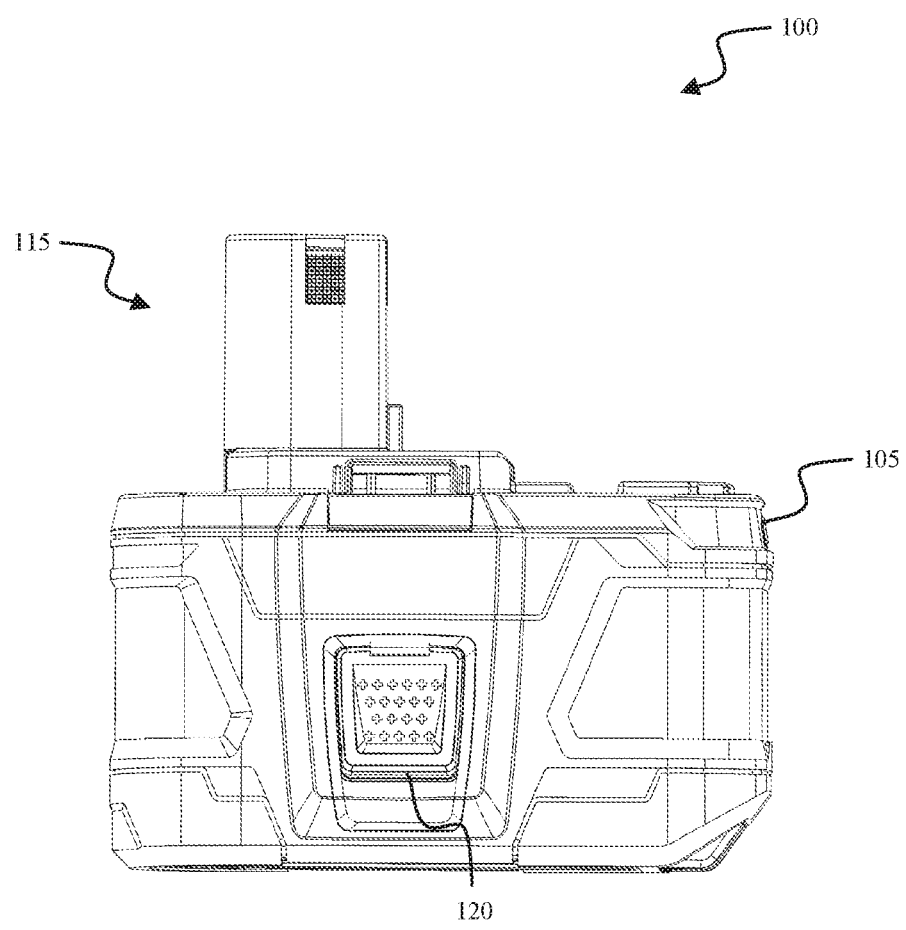
FIG. 1 is a side view of a battery pack, according to embodiments described herein.
Figure 2:
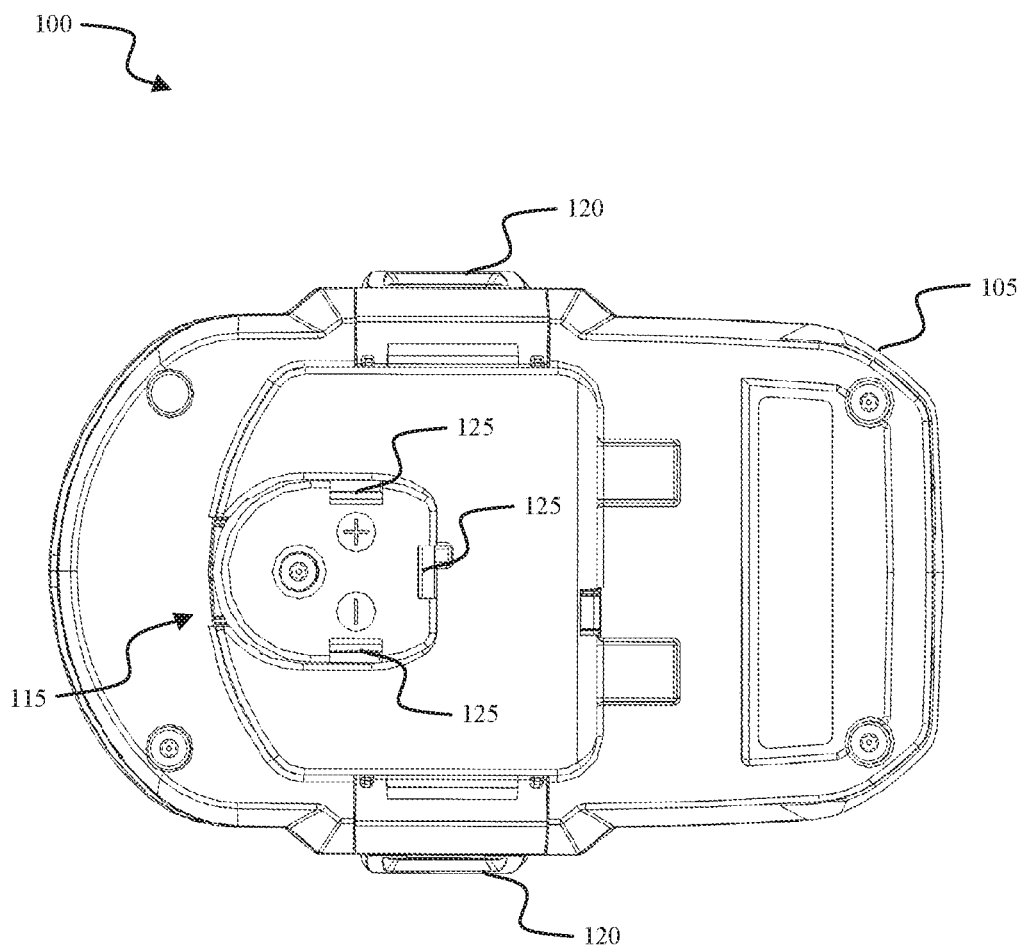
FIG. 2 is a top view of the battery pack of FIG. 1.
Figure 3:
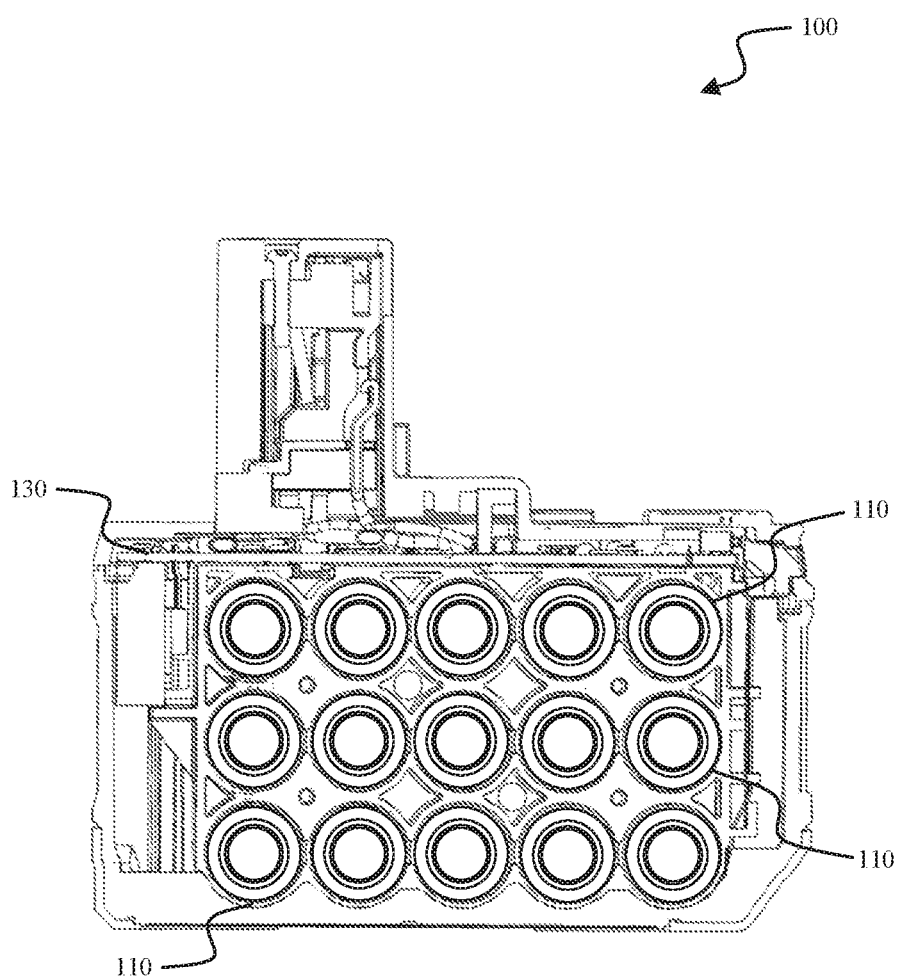
FIG. 3 is a section view of the battery pack of FIG. 1 showing battery cells, according to embodiments described herein.

FIGS. 1-3 illustrate a battery pack 100 that includes an enable circuit. The battery pack 100 is connectable to and supportable by hand-held power tools such as drills, saws, pipe cutters, sanders, nailers, staplers, vacuum cleaners, inflators, etc. The battery pack 100 is also connectable to and supportable by outdoor power products such as string trimmers, hedge trimmers, blowers, chain saws, pressure washers, snow blowers, mowers, etc. The devices to which the battery pack 100 is connectable to and supportable by are collectively referred to herein as a tool or tools. The battery pack 100 is disabled and prevented from operating (i.e., discharging current and/or receiving charging current) until the enable circuit is activated. As shown in FIGS. 1-3, the battery pack 100 includes a housing 105 and at least one rechargeable battery cell 110 (shown in FIG. 3) supported by the housing 105. The battery pack 100 also includes a support portion 115 for supporting the battery pack 100 on a tool, and a coupling mechanism 120 for selectively coupling the battery pack 100 to, or releasing the battery pack 100 from, the tool. The support portion 115 is connectable to a complementary support portion on the tool.

The battery pack 100 includes a plurality of terminals 125 within the support portion 115 and operable to electrically connect the battery cells 110 to a PCB 130 within the battery pack 100. The plurality of terminals 125 includes, for example, a positive battery terminal, a ground terminal, and a sense or data terminal. The battery pack 100 is removably and interchangeably connected to tools to provide operational power to the tools. The terminals 125 are configured to mate with corresponding power terminals extending from a tool within a complementary receiving portion.

The illustrated battery pack 100 includes fifteen battery cells 110. In other embodiments, the battery pack 100 can include more or fewer battery cells 110. The battery cells can be arranged in series, parallel, or a series-parallel combination. For example, the battery pack 100 can include a total of fifteen battery cells configured in a series-parallel arrangement of five sets of three series-connected cells. The series-parallel combination of battery cells allows for an increased voltage and an increased capacity of the battery pack. In some embodiments, the battery pack 100 includes five series-connected battery cells. In other embodiments, the battery pack 100 includes a different number of battery cells (e.g., between three and thirty battery cells) connected in series, parallel, or a series-parallel combination in order to produce a battery pack having a desired combination of nominal battery pack voltage and battery pack capacity.

The battery cells 110 are lithium-based battery cells having a chemistry of, for example, lithium-cobalt ("Li—Co"), lithium-manganese ("Li—Mn"), or Li—Mn spinel. In some embodiments, the battery cells 110 have other suitable lithium or lithium-based chemistries, such as a lithium-based chemistry that includes manganese, etc. The battery cells within the battery pack 100 provide operational power (e.g., voltage and current) to the tools. In one embodiment, each battery cell 110 has a nominal voltage of approximately 3.6V, such that the battery pack has a nominal voltage of approximately 18V. In other embodiments, the battery cells have different nominal voltages, such as, for example, between 3.6V and 4.2V, and the battery pack has a different nominal voltage, such as, for example, 10.8V, 12V, 14.4V, 24V, 28V, 36V, 60V, 80V, between 10.8V and 80V, etc. The battery cells 110 also each have a capacity of, for example, approximately between 1.0 ampere-hours ("Ah") and 6.0 Ah. In exemplary embodiments, the battery cells have capacities of approximately, 1.5 Ah, 2.4 Ah, 3.0 Ah, 4.0 Ah, 6.0 Ah, between 1.5 Ah and 6.0 Ah, etc.

Figure 4:
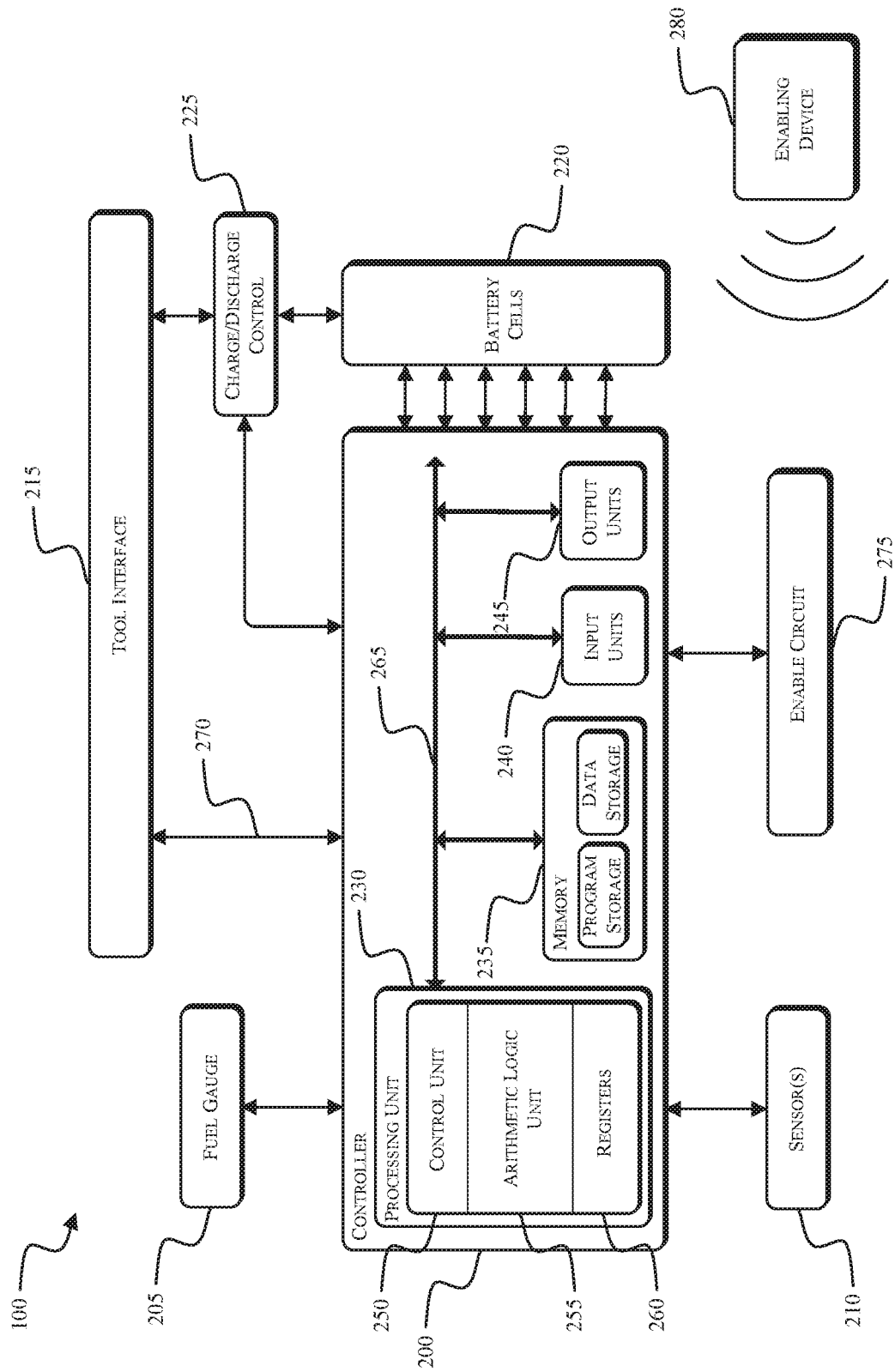
FIG. 4 illustrates a battery pack including an enable circuit, according to embodiments described herein.

Once enabled, the power output by the battery pack 100 to a tool is controlled, monitored, and regulated using control electronics within the battery pack 100, a tool, or a combination thereof. FIG. 4 illustrates a controller 200 associated with the battery pack 100. The controller 200 is electrically and/or communicatively connected to a variety of modules or components of the battery pack 100. For example, the illustrated controller 200 is connected to a fuel gauge 205, one or more sensors 210, a tool interface 215, a plurality of battery cells 220, a charge/discharge control module 225 (optional within battery pack), and a enable circuit 275 that is activated by a signal from an enabling device 280. The controller 200 includes combinations of hardware and software that are operable to, among other things, control the operation of the battery pack 100, activate the fuel gauge 205, monitor the operation of the battery pack 100, etc. The fuel gauge 205 includes, for example, one or more indicators, such as light-emitting diodes ("LEDs"). The fuel gauge 205 can be configured to display conditions of, or information associated with, the state-of-charge of the battery cells 220. The controller 200 also includes a variety of preset or calculated fault condition values related to temperatures, currents, voltages, etc., associated with the operation of a tool.

In some embodiments, the controller 200 includes a plurality of electrical and electronic components that provide power, operational control, and protection to the components and modules within the controller 200 and/or the battery pack 100. For example, the controller 200 includes, among other things, a processing unit 230 (e.g., a microprocessor, a microcontroller, or another suitable programmable device), a memory 235, input units 240, and output units 245. The processing unit 230 includes, among other things, a control unit 250, an arithmetic logic unit ("ALU") 255, and a plurality of registers 260 (shown as a group of registers in FIG. 4), and is implemented using a known computer architecture (e.g., a modified Harvard architecture, a von Neumann architecture, etc.). The processing unit 230, the memory 235, the input units 240, and the output units 245, as well as the various modules connected to the controller 200 are connected by one or more control and/or data buses (e.g., common bus 265). The control and/or data buses are shown generally in FIG. 4 for illustrative purposes. The use of one or more control and/or data buses for the interconnection between and communication among the various modules and components would be known to a person skilled in the art in view of the invention described herein.

The memory 235 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 235 and executes software instructions that are capable of being stored in a RAM of the memory 235 (e.g., during execution), a ROM of the memory 235 (e.g., on a generally permanent basis), or another non-transitory computer readable medium such as another memory or a disc. Software included in the implementation of the battery pack 100 can be stored in the memory 235 of the controller 200. The software includes, for example, firmware, one or more applications, program data, filters, rules, one or more program modules, and other executable instructions. The controller 200 is configured to retrieve from memory and execute, among other things, instructions related to the control of the battery pack described herein. The controller 200 can also store various battery pack parameters and characteristics (including battery pack nominal voltage, chemistry, battery cell characteristics, maximum allowed discharge current, maximum allowed temperature, etc.). In other constructions, the controller 200 includes additional, fewer, or different components.

The tool interface 215 includes a combination of mechanical components (e.g., the support portion 115) and electrical components (e.g., the plurality of terminals 125) configured to, and operable for, interfacing (e.g., mechanically, electrically, and communicatively connecting) the battery pack 100 with a tool. For example, power provided from the battery pack 100 to a tool is provided through the charge/discharge control module 225 to the tool interface 215. The charge/discharge control module 225 includes, for example, one or more switches (e.g., FETs) for controlling the charging current to and discharge current from the battery cells 220. The tool interface 215 also includes, for example, a communication line 270 for providing a communication line or link between the controller 200 and a tool.

The sensors 210 include, for example, one or more current sensors, one or more voltage sensors, one or more temperature sensors, etc. For example, the controller 200 uses the sensors 210 to monitor an individual state of charge of each of the battery cells 220, monitor a current being discharged from the battery cells 220, monitor the temperature of one or more of the battery cells 220, etc. If the voltage of one of the battery cells 220 is equal to or above an upper voltage limit (e.g., a maximum charging voltage), the charge/discharge control module 225 prevents the battery cells from being further charged or requests that a battery charger (see FIGS. 7 and 8) provide a constant voltage charging scheme.

Alternatively, if one of the battery cells 220 falls below a low-voltage limit, the charge/discharge control module 225 prevents the battery cells 220 from being further discharged. Similarly, if an upper or lower operational temperature limit for the battery cells 220 is reached, the controller 200 can prevent the battery pack 100 from being charged or discharged until the temperature of the battery cells 220 or the battery pack 100 is within an acceptable temperature range. The enable circuit 275 can be implemented to control the battery pack 100 between a disabled state and an enabled state. For example, the enable circuit 275 can be configured to directly open a fuse, to indirectly open a fuse, to trigger the setting of a flag in the controller 200's memory 235, to communicate with the controller 200 or enabling device 280, etc. When in the disabled state, for example, the controller 200 prevents the charge/discharge control module 225 from discharging current from the battery cells 220. When in the enabled state, the charge/discharge control module 225 and controller 200 would permit the discharging of current from the battery cells 220.

Figure 5:
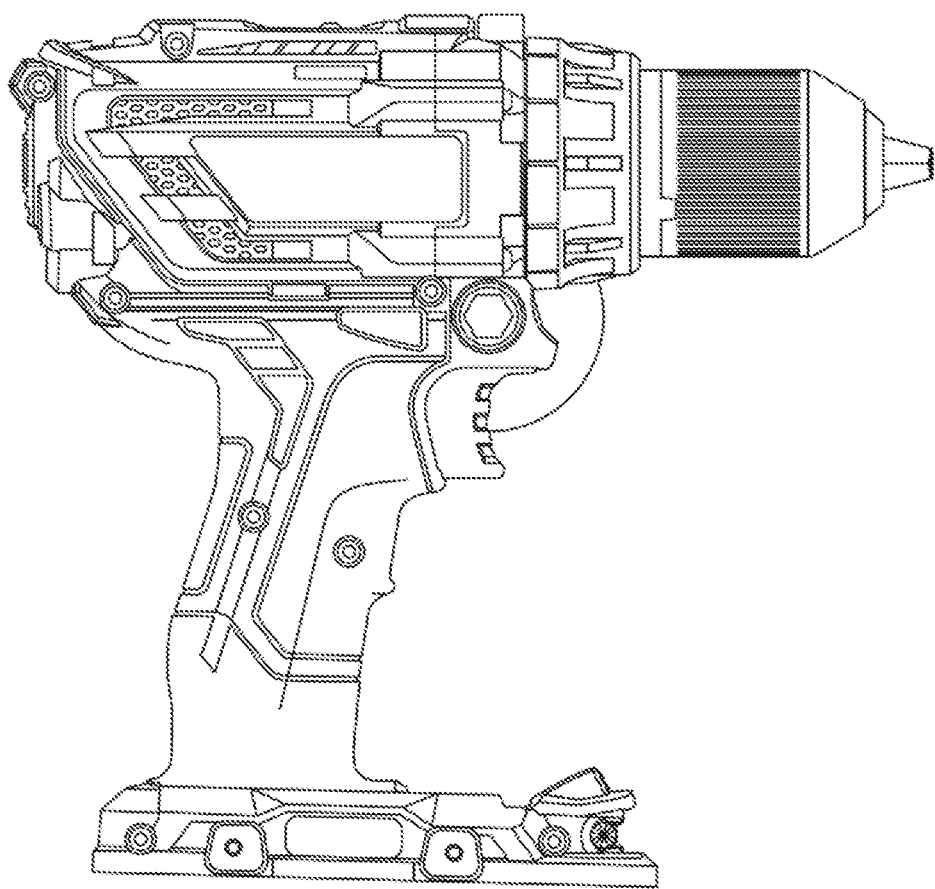
FIG. 5 illustrates a tool including an enable circuit.
Figure 6:
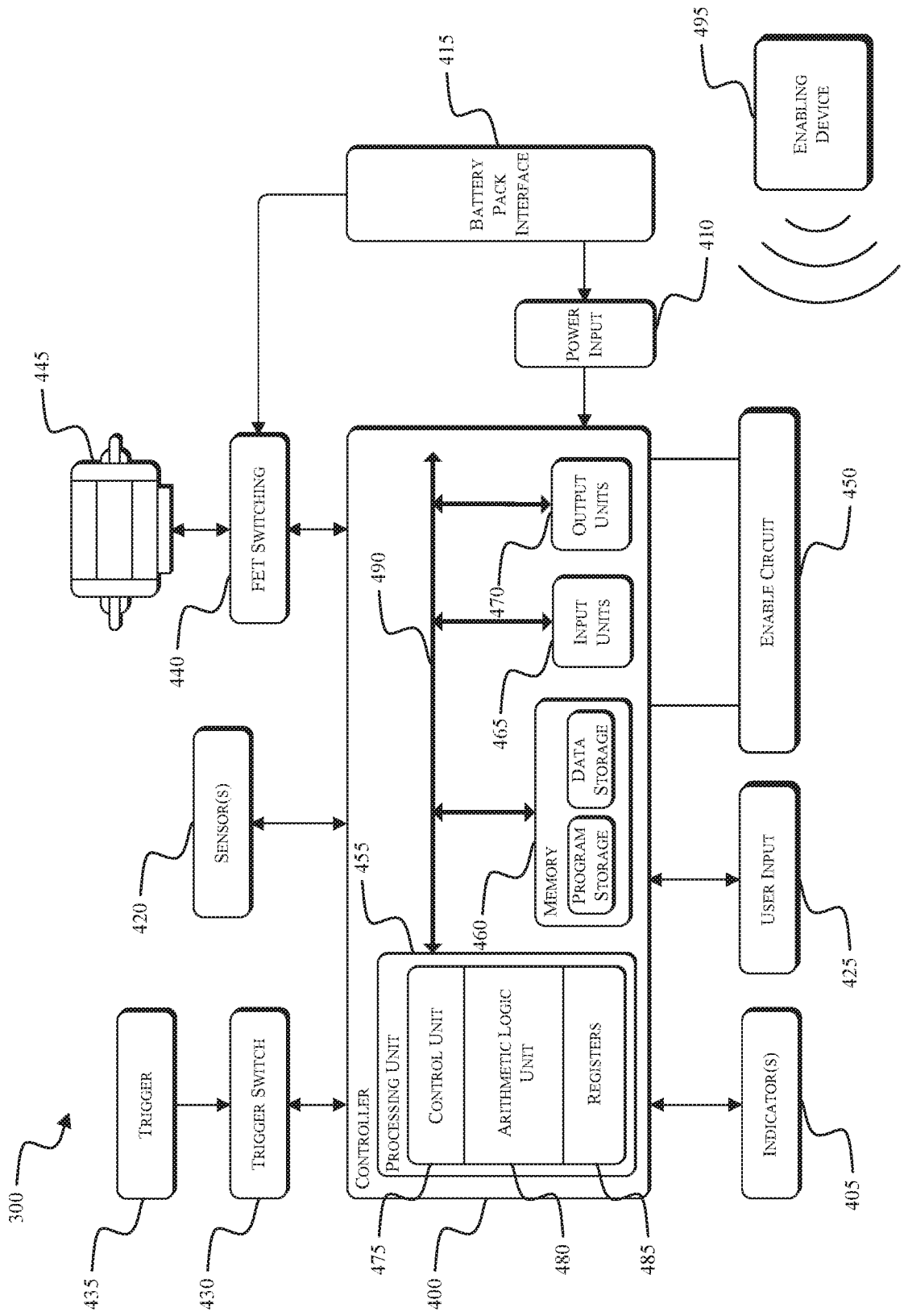
FIG. 6 illustrates a tool including an enable circuit, according to embodiments described herein.

FIG. 5 illustrates a device 300, such as a power tool, that includes an enable circuit. FIG. 6 illustrates a controller 400 associated with the power tool 300. The controller 400 is electrically and/or communicatively connected to a variety of modules or components of the power tool 300 that are located within the power tool's housing. For example, the illustrated controller 400 is connected to one or more indicators 405, a power input module 410, a battery pack interface 415, one or more sensors 420, a user input module 425, a trigger switch 430 (connected to trigger 435), a FET switching module 440 (e.g., including one or more switching FETs) connected to a motor 445, and an enable circuit 450 that is activated by a signal from an enabling device 495. In some embodiments, the trigger switch 430 is combined and integral with the controller 400 within the power tool 300. The controller 400 includes combinations of hardware and software that are operable to, among other things, control the operation of the power tool 300, monitor the operation of the power tool 300, enable the operation of the power tool 300, activate the one or more indicators 405 (e.g., an LED), etc.

In some embodiments, the controller 400 includes a plurality of electrical and electronic components that provide power, operational control, and protection to the components and modules within the controller 400 and/or the power tool 300. For example, the controller 400 includes, among other things, a processing unit 455 (e.g., a microprocessor, a microcontroller, or another suitable programmable device), a memory 460, input units 465, and output units 470. The processing unit 455 includes, among other things, a control unit 475, an ALU 480, and a plurality of registers 485 (shown as a group of registers in FIG. 6), and is implemented using a known computer architecture (e.g., a modified Harvard architecture, a von Neumann architecture, etc.). The processing unit 455, the memory 460, the input units 465, and the output units 470 as well as the various modules connected to the controller 400 are connected by one or more control and/or data buses (e.g., common bus 490). The control and/or data buses are shown generally in FIG. 6 for illustrative purposes. The use of one or more control and/or data buses for the interconnection between and communication among the various modules and components would be known to a person skilled in the art in view of the invention described herein.

The memory 460 is a non-transitory computer readable medium and includes, for example, a program storage area and a data storage area. The program storage area and the data storage area can include combinations of different types of memory, such as ROM, RAM, EEPROM, flash memory, a hard disk, an SD card, or other suitable magnetic, optical, physical, electronic memory devices, or other data structures. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the power tool 300 can be stored in the memory 460 of the controller 400. The software includes, for example, firmware, one or more applications, program data, filters, rules, one or more program modules, and other executable instructions. The controller 400 is configured to retrieve from memory and execute, among other things, instructions related to the control processes and methods described herein.

The battery pack interface 415 includes a combination of mechanical and electrical components configured to, and operable for, interfacing (e.g., mechanically, electrically, and communicatively connecting) the power tool 300 with the battery pack 100. For example, power provided by the battery pack 100 to the power tool 300 is provided through the battery pack interface 415 to the power input module 410. The power input module 410 includes combinations of active and passive components to regulate or control the power received from the battery pack 100 prior to power being provided to the controller 400. The battery pack interface 415 also supplies power to the FET switching module 440 to be switched by the switching FETs to selectively provide power to the motor 445. In some embodiments, the battery pack interface 415 also includes a communication line for providing a communication line or link between the controller 400 and the battery pack 100.

The indicators 405 include, for example, one or more LED. The indicators 405 can be configured to display conditions of, or information associated with, the power tool 300. For example, the indicators 405 are configured to indicate measured electrical characteristics of the power tool, the status of the power tool, etc. The sensors 420 include, for example, one or more current sensors, one or more speed sensors, one or more Hall Effect sensors, one or more temperature sensors, one or more pressure sensors (e.g., to detect a fastener being placed against a work surface), etc. For example, the speed of the motor 445 can be determined using a plurality of Hall Effect sensors to sense the rotational position of the motor 445. The temperature sensors can be used to determine an ambient temperature of the air around the power tool 300.

The user input module 425 is operably coupled to the controller 400 to, for example, select a forward mode of operation or a reverse mode of operation, a torque and/or speed setting for the power tool 300, etc. In some embodiments, the user input module 425 includes a combination of digital and analog input or output devices required to achieve a desired level of operation for the power tool 300, such as one or more knobs, one or more dials, one or more switches, one or more buttons, etc. The trigger switch 430 is connected to the trigger 435 for controlling the power provided to the motor 445 through the switching FETs. In some embodiments, the amount of trigger pull detected by the trigger switch 430 is related to or corresponds to a desired speed of rotation of the motor 445. In other embodiments, the amount of trigger pull detected by the trigger switch 430 is related to or corresponds to a desired torque.

The enable circuit 450 can be implemented to control the power tool 300 between a disabled state and an enabled state. For example, the enable circuit 450 can be configured to directly open a fuse, to indirectly open a fuse, to trigger the setting of a flag in the controller 400's memory 460, to communicate with the controller 400 or enabling device 495, etc. When in the disabled state, for example, the controller 400 prevents the FET switching module 440 from providing current to the motor 445. When in the enabled state, the FET switching module 440 would permit current to be provided to the motor 445.

Figure 7:
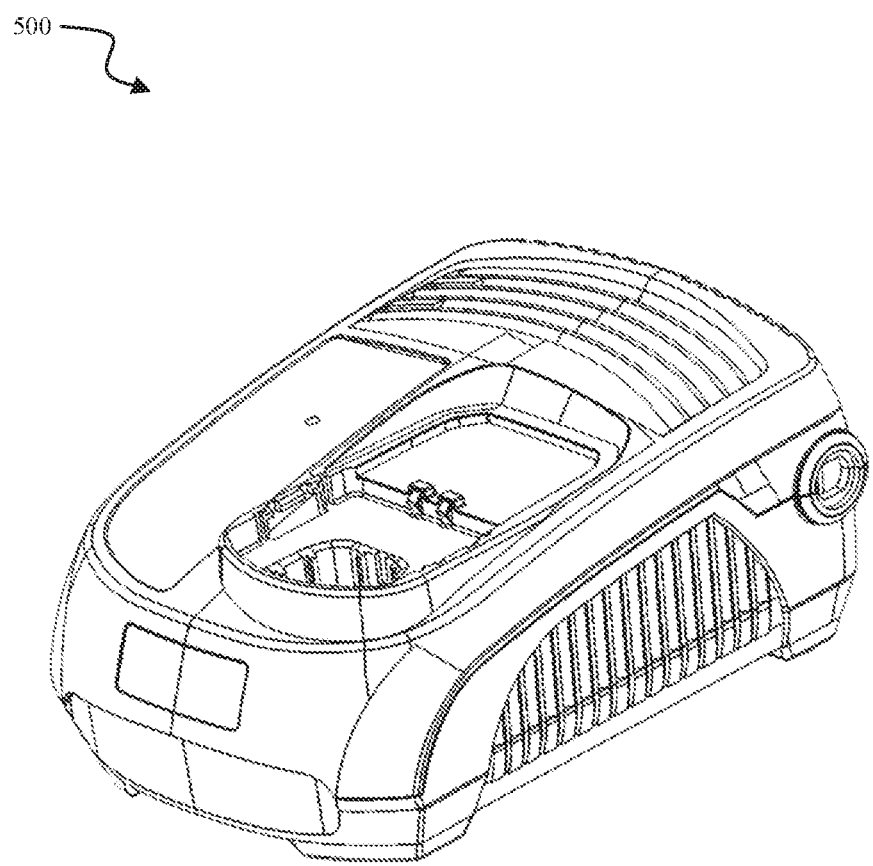
FIG. 7 illustrates a battery charger including an enable circuit.
Figure 8:
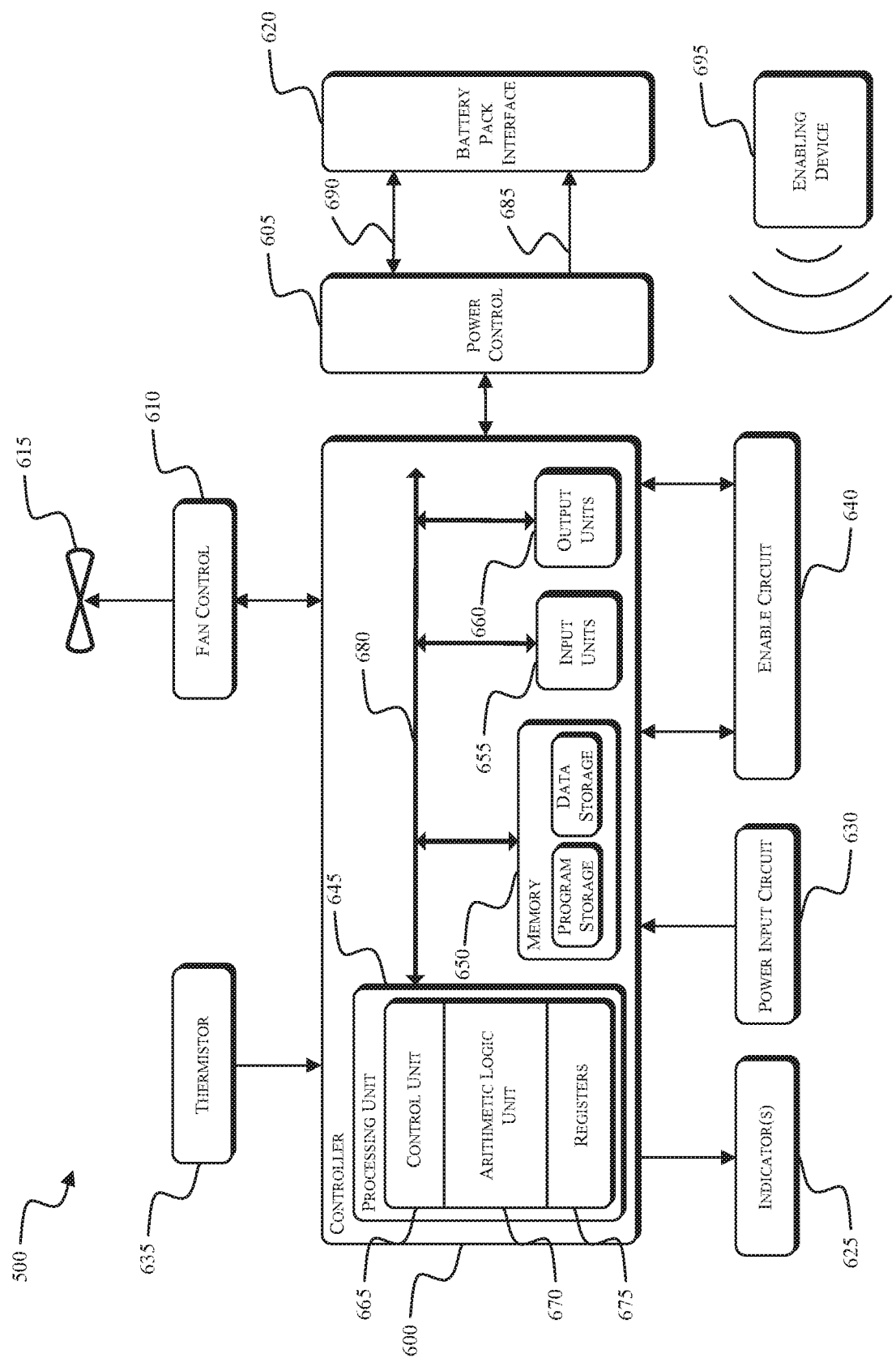
FIG. 8 illustrates a battery pack charger including an enable circuit, according to embodiments described herein.

FIG. 7 illustrates a device 500, such as a battery pack charger, that includes an enable circuit. FIG. 8 illustrates a controller 600 associated with the battery pack charger 500. The controller 600 is electrically and/or communicatively connected to a variety of modules or components of the battery pack charger 500 that are located within the charger's housing. For example, the illustrated controller 600 is connected to a power control module 605, a fan control module 610 for a fan 615, a battery pack interface 620, indicators 625, a power input circuit 630, a thermistor 635, and an enable circuit 640 that is activated by a signal from an enabling device 695. The controller 600 includes combinations of hardware and software that are operable to, among other things, control the operation of the battery pack charger 500, estimate the temperature of the charger 500, enable the charger 500, activate the indicators 625 (e.g., one or more LEDs), etc.

In some embodiments, the controller 600 includes a plurality of electrical and electronic components that provide power, operational control, and protection to the components and modules within the controller 600 and/or battery pack charger 500. For example, the controller 600 includes, among other things, a processing unit 645 (e.g., a microprocessor, a microcontroller, or another suitable programmable device), a memory 650, input units 655, and output units 660. The processing unit 645 includes, among other things, a control unit 665, an ALU 670, and a plurality of registers 675 (shown as a group of registers in FIG. 8), and is implemented using a known computer architecture (e.g., a modified Harvard architecture, a von Neumann architecture, etc.). The processing unit 645, the memory 650, the input units 655, and the output units 660, as well as the various modules connected to the controller 600 are connected by one or more control and/or data buses (e.g., common bus 680). The control and/or data buses are shown generally in FIG. 8 for illustrative purposes. The use of one or more control and/or data buses for the interconnection between and communication among the various modules and components would be known to a person skilled in the art in view of the invention described herein.

The memory 650 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 645 is connected to the memory 650 and executes software instructions that are capable of being stored in a RAM of the memory 650 (e.g., during execution), a ROM of the memory 650 (e.g., on a generally permanent basis), or another non-transitory computer readable medium such as another memory or a disc. Software included in the implementation of the battery pack charger 500 can be stored in the memory 650 of the controller 600. The software includes, for example, firmware, one or more applications, program data, filters, rules, one or more program modules, and other executable instructions. The controller 600 is configured to retrieve from the memory 650 and execute, among other things, instructions related to the control processes and methods described herein. In other embodiments, the controller 600 includes additional, fewer, or different components.

The battery pack interface 620 includes a combination of mechanical components and electrical components configured to, and operable for, interfacing (e.g., mechanically, electrically, and communicatively connecting) the battery pack charger 500 with the battery pack 100. For example, the battery pack interface 620 is configured to receive power from the power control module 605 via a power line 685 between the power control module 605 and the battery pack interface 620. The battery pack interface 620 is also configured to communicatively connect to the power control module 605 via a communications line 690.

The enable circuit 640 can be implemented to control the charger 500 between a disabled state and an enabled state. For example, the enable circuit 640 can be configured to directly open a fuse, to indirectly open a fuse, to trigger the setting of a flag in the controller 600's memory 650, to communicate with the controller 600 or the enabling device 695, etc. When in the disabled state, for example, the controller 600 prevents the power control module 605 from providing charging current to the battery pack interface 620. When in the enabled state, the power control module 605 and controller 600 would permit charging current to be provided to the battery pack interface 620.

Figure 9A:
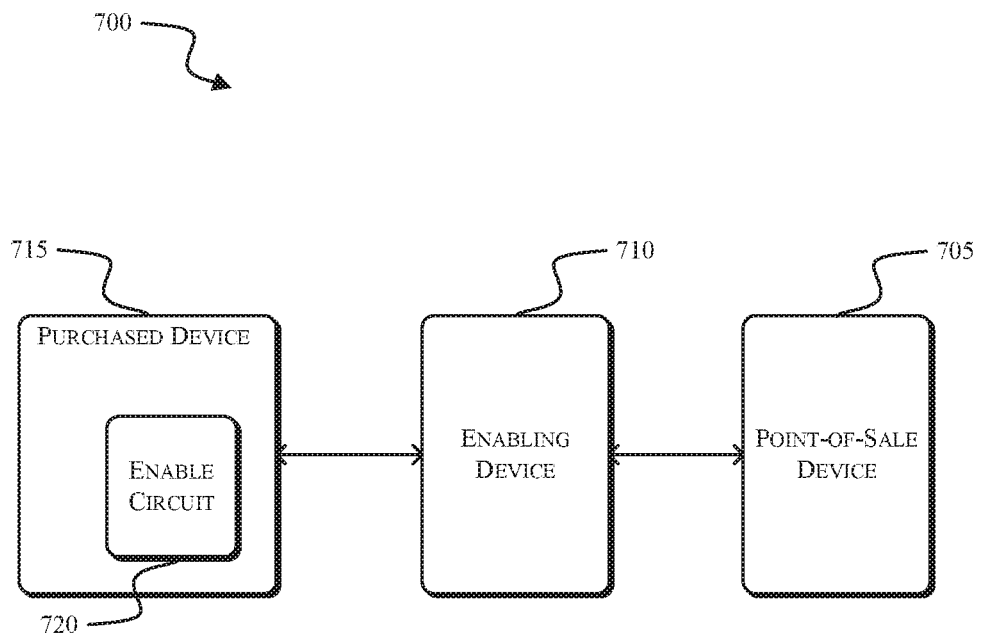
FIG. 9A illustrates a system for enabling a purchased device, according to embodiments described herein.

FIG. 9A illustrates a system 700 for enabling a purchased device (e.g., battery pack 100, tool 300, charger 500, etc.). The system 700 includes a point-of-sale device 705 (e.g., a store checkout device or computer), an enabling device 710, and a purchased device 715. The purchased device 715 includes an enable circuit 720. In some embodiments, the enable circuit 720 includes an activation component that, when activated, enables the purchased device 715. In other embodiments, the enable circuit 720 is configured to interact with a device controller (e.g., controller 200, 400, 600) for controller-based enablement. The point-of-sale device 705 is connected to the enabling device 710. In some embodiments, the enabling device 710 is a separate handheld wand or barcode scanner that can be used to both scan the purchased item (e.g., for the purpose of completing a sale) and enable the purchased item (e.g., using NFC communication). The separate enabling device 710 works in conjunction with the point-of-sale device 705 to complete the purchase and enable the purchased device 715. The enabling device 710 is illustrated with a connection to the purchased device 715. In some embodiments, the connection is communication between the purchased device 715 and the enabling device 710. In other embodiments, the connection is one-way (e.g., enabling device 710 to purchased device 715) for activating the purchased device 715.

Figure 9B:
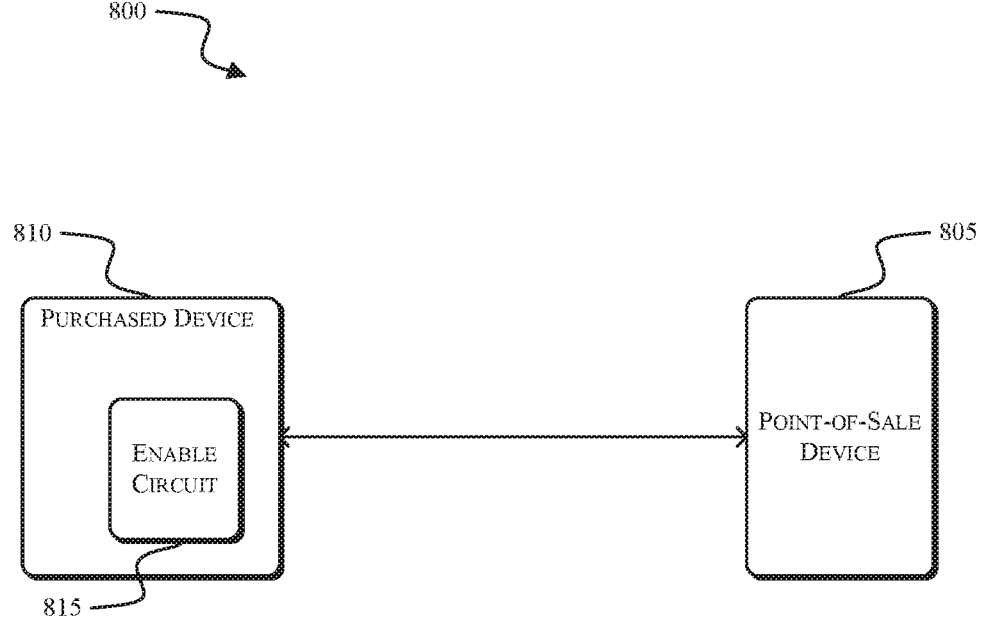
FIG. 9B illustrates another system for enabling a purchased device, according to embodiments described herein.

FIG. 9B illustrates a system 800 for enabling a purchased device (e.g., battery pack 100, tool 300, charger 500, etc.). The system 800 includes a point-of-sale device 805 (e.g., a store checkout device or computer) and a purchased device 810. The purchased device 810 includes an enable circuit 815. In some embodiments, the enable circuit 815 includes an activation component that, when activated, enables the purchased device 810. In other embodiments, the enable circuit 815 is configured to interact with a device controller (e.g., controller 200, 400, 600) for controller-based enablement. In the illustrated embodiment, the point-of-sale device 805 is not connected to a separate enabling device. Rather, in the illustrated embodiment, the point-of-sale device 805 is configured to both scan the purchased item (e.g., for the purpose of completing a sale) and enable the purchased item (e.g., using NFC communication). The point-of-sale device 805 is illustrated with a connection to the purchased device 810. In some embodiments, the connection is communication between the purchased device 810 and the point-of-sale device 805. In other embodiments, the connection is one-way (e.g., point-of-sale device 805 to purchased device 810) for activating the purchased device 810. In some embodiments, a mobile or cellular phone including an NFC circuit and antenna replaces the enabling device 710 or point-of-sale device 805.

Figure 10:
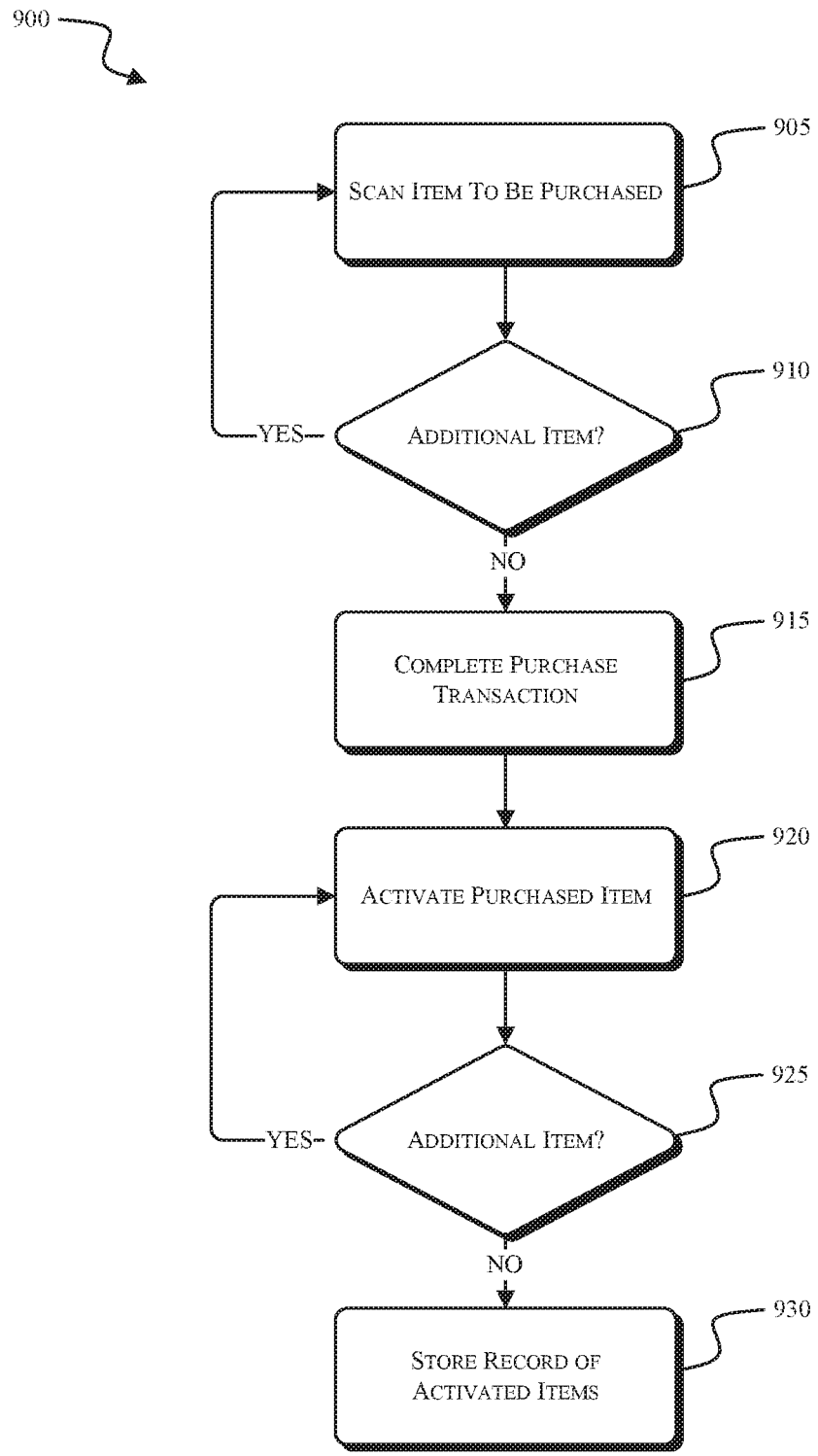
FIG. 10 is a process for enabling a purchased item, according to embodiments described herein.

FIG. 10 is a process 900 for enabling a purchased item or multiple purchased items (e.g., when items are sold as a kit). Although the process 900 is illustrated as being performed in a serial manner, various steps of the process 900 can be performed in parallel or in an order that differs from the order illustrated in FIG. 10. The process 900 illustrated in FIG. 10 is merely illustrative of a particular process for enabling a purchased item or device. The process 900 begins with scanning an item to be purchased (STEP 905). Scanning can include, for example, barcode scanning the item using a point-of-sale device (e.g., point-of-sale computer) or a separate handheld wand that includes a scanner. At STEP 910, if there are additional items to be scanned, the process 900 returns to STEP 905. If there are no additional items to be scanned, the process 900 proceeds to STEP 915 where the purchase transaction is completed (e.g., items are purchased using a credit card).

After the purchase transaction has been completed, the purchased items are activated or enabled for future use (STEP 920). Enabling the purchased items can be achieved in a variety of ways, as described herein. In some embodiments, the enable circuit of a purchased item includes an NFC circuit that is configured to interact with a point-of-sale computer or a separate enabling device (e.g., receive NFC signals from). The NFC circuit is configured, for example, to receive a password (e.g., a first value) from the point-of-sale computer or enabling device. In some embodiments, the password is a static password (e.g., obtained from a server communicatively connected to the enabling device 710 or point-of-sale device 805). In other embodiments, the password is a dynamic password and determined or calculated by the controller 200, 400, 600, enabling device 710, or point-of-sale device 805. The NFC circuit is configured to store the received password in memory (e.g., a value corresponding to the signal received from the enabling device). The password can later be compared by the purchased item to a password (e.g., a second value) stored in the purchased item's memory (e.g., the NFC circuit is passive). When the password stored in the purchased item's memory and the password written to the NFC circuit match, the item will operate normally. In some embodiments, if the passwords do not match, the item will not be enabled. In some embodiments, the point-of-sale computer is configured such that it ensures proper enablement of the item based on the point-of-sale computer's ability to communicate with the NFC circuit (e.g., by retrieving stored identification information from the NFC circuit). In some embodiments, the NFC circuit actively inhibits the operation of the controller 200, 400, 600, and a device is not enabled until the NFC circuit enables the device (e.g., the NFC circuit prevents a switch from passing current). In other embodiments, the NFC circuit actively prohibits the operation of the controller 200, 400, 600. For example, the NFC circuit would be required to provide a signal to the controller 200, 400, 600 in order for the controller 200, 400, 600 to operate normally. In the absence of a signal from the NFC circuit, the device remains non-operational. In some embodiments, a purchaser is required to view an operational, instructional, or safety video before the device is enabled (e.g., by confirming that watching the video was completed).

If, at STEP 925, additional purchased items require enablement (e.g., as determined by the point-of-sale computer), each additional item can be enabled at STEP 920. In some embodiments, each purchased item is an individual, stand-alone item. In other embodiments, multiple items may be bundled together in a kit (e.g., in a single box). In such embodiments, each item within the kit can be individually enabled as described above. For example, the point-of-sale computer knows what items are included in the kit based on a barcode scan. The point-of-sale computer or enabling device can then individually confirm that each of items included in the kit has been activated (e.g., a password written to each NFC circuit). When all purchased items have been enabled, the point-of-sale computer stores a record of both what items were purchased and what items were enabled among the purchased items (STEP 930). As described below with respect to FIG. 11, storing a record of enabled items permits a point-of-sale computer to subsequently disable the purchased items when they are returned to the store.

Figure 11:
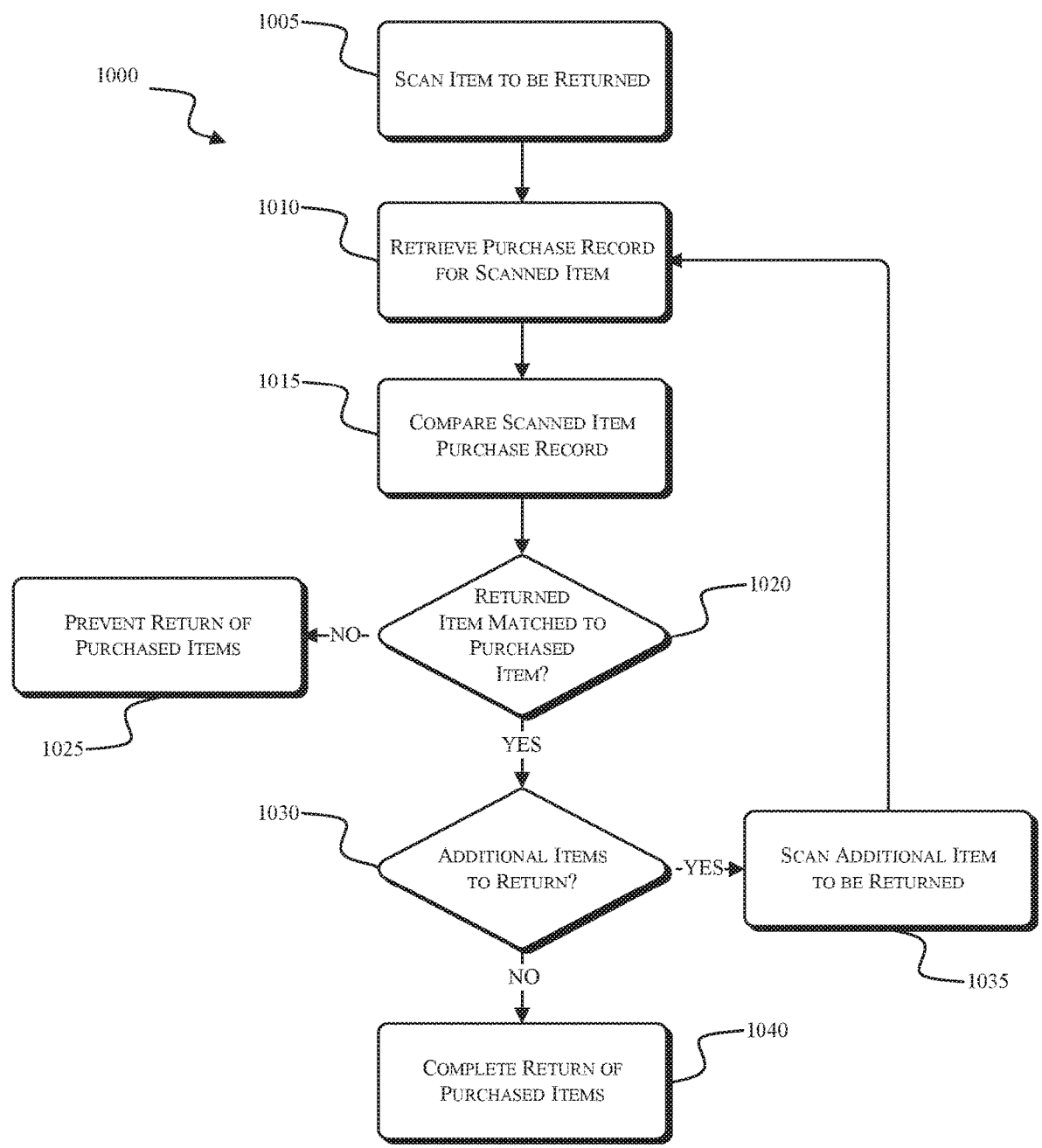
FIG. 11 is a process for returning a purchased item, according to embodiments described herein.

FIG. 11 is a process 1000 for returning a purchased item or multiple purchased items (e.g., when items are sold as a kit) to a retailer. Although the process 1000 is illustrated as being performed in a serial manner, various steps of the process 1000 can be performed in parallel or in an order that differs from the order illustrated in FIG. 11. Upon the return of a purchased item or items to a store, a point-of-sale computer can be used to scan the item (e.g., using a barcode scanner) (STEP 1005). Based on the item's barcode, a purchase record for the returned item can be retrieved from memory (e.g., of the point-of-sale computer, stored on a server, etc.) (STEP 1010). The scanned item can be compared to the purchase record (STEP 1015) to determine, for example, whether the item is the correct type of item, whether the item was a part of a kit that included other items, and whether the item is an item that was previously enabled using the process 900 of FIG. 10. For example, when the returned item is scanned an NFC reader in the point-of-sale computer or enabling device also reads the password (if present) previously written to the NFC memory.

If, at STEP 1020, the returned item is not fully matched to the purchased item, the point-of-sale computer is configured to prevent the completion of the return of the purchased item (STEP 1025). For example, if the password read from the NFC circuit does not match the purchase record or a password in the NFC circuit was expected but not present (e.g., unable to be read), return of the item can be prevented. Additionally, if the item was a part of a kit and one or more items of the kit is missing or does not fully match the purchase record (e.g., a purchased tool was replaced with an older tool in the return attempt), the return of the item can be prevented. If, at STEP 1020, the return item fully matches the purchased item and additional items need to be returned (STEP 1030), the additional items are scanned (STEP 1035) and the process 1000 returns to STEP 1010. In some embodiments, the additional items to be returned are additional items in a kit that included multiple items. When there are no additional items to be returned at STEP 1030, the return of the purchased items is completed (STEP 1040). The completion of the returned items includes, for example, issuing a refund or store credit for the returned items. In some embodiments, completing the return of the items includes disabling the returned items (e.g., opposite to the process 900). For example, the password that was written to the NFC circuit to enable the item is erased by a signal from the point-of-sale computer or an enabling device to render the returned item disabled. The device can then be re-enabled upon subsequent re-purchase using the process 900.

Figure 12A:
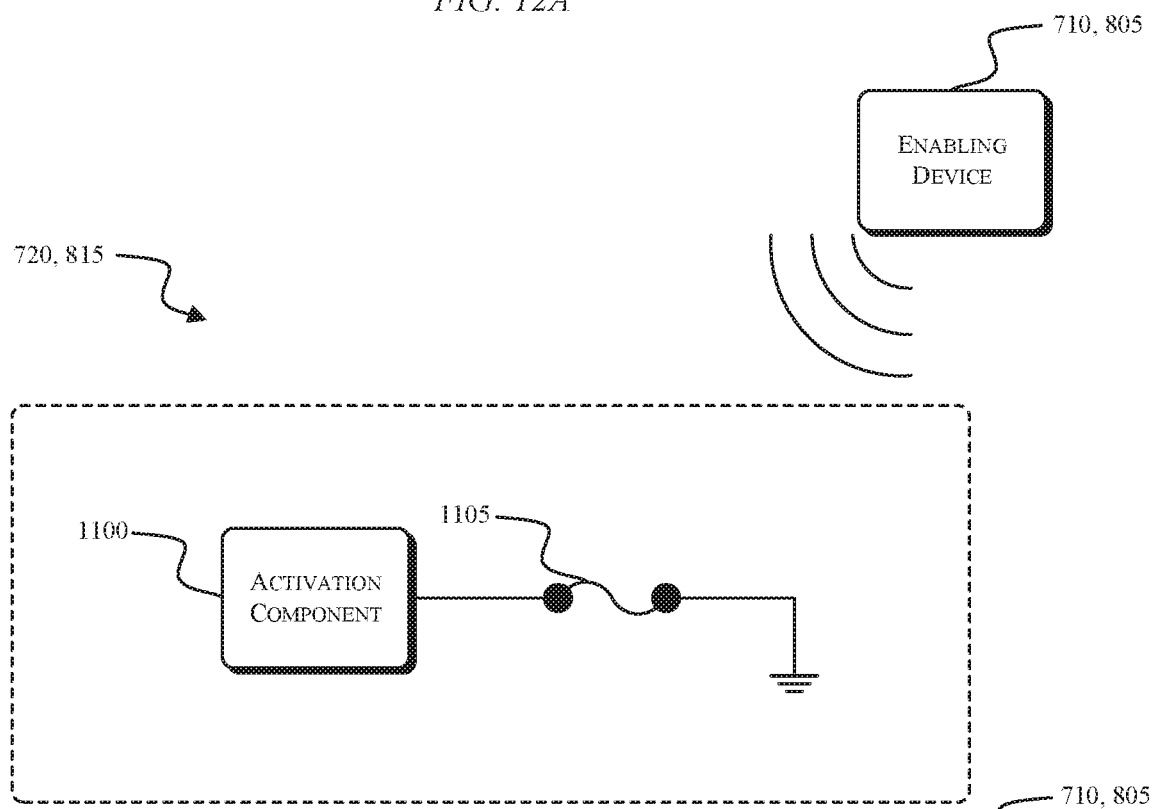
FIG. 12A illustrates a enable circuit, according to embodiments described herein.

FIG. 12A illustrates a enable circuit 720, 815 that includes an activation component 1100 and a fuse 1105. The activation component 1100 is, for example, an inductor. When the device is scanned at the checkout lane of a store, an enabling device 710, 805 (e.g., a magnetic tag deactivation scanner) activates the activation component 1100. The activation component (e.g., an inductor) can be selected such that the enabling device 710, 805 induces a current in the inductor. The induced current is sufficient to directly cause the fuse 1105 to be opened (i.e., the activation component 1100 is electrically connected in series with the fuse 1105). In some embodiments, the enable circuit 720, 815 does not include software and includes a logic circuit that controls the activation component to enable the device.

Figure 12B:
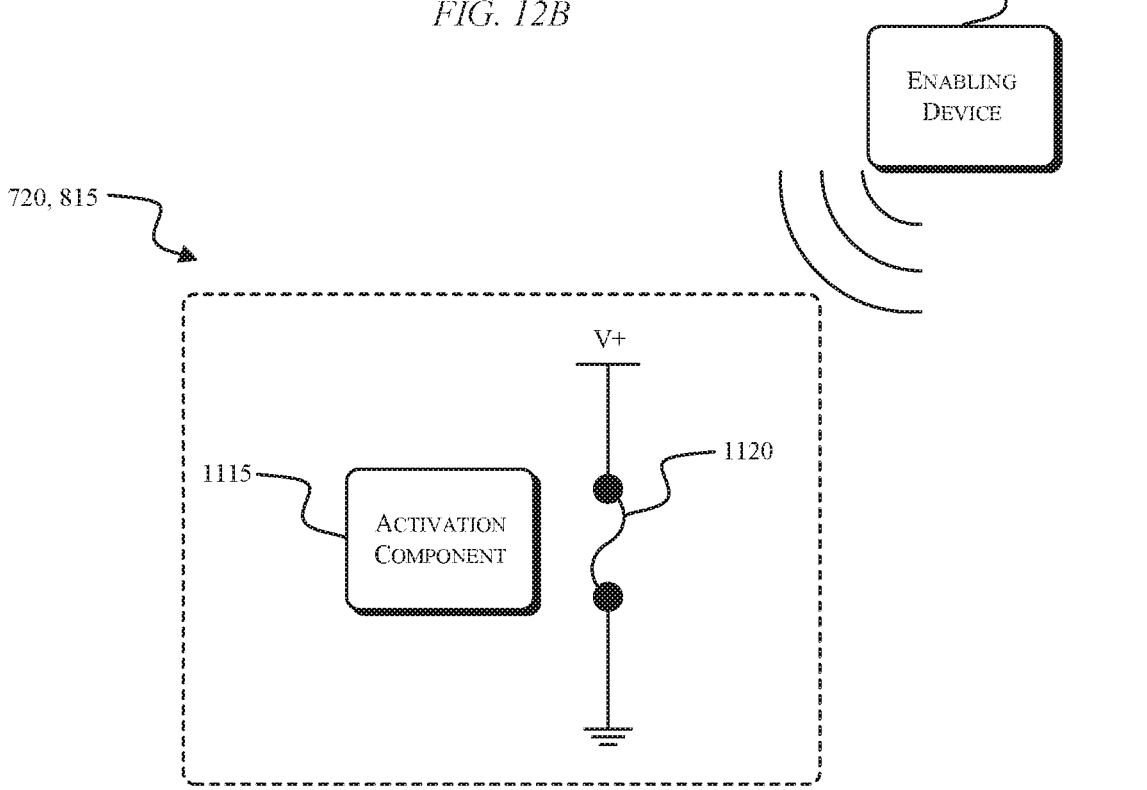
FIG. 12B illustrates a enable circuit, according to embodiments described herein.

FIG. 12B illustrates a enable circuit 720, 815 that includes an activation component 1115 and a fuse 1120. In FIG. 12B, the activation component 1115 has an indirect association with the fuse 1120. As a result, when the activation component 1115 is activated, the activation component 1115 indirectly causes the fuse 1120 to be opened. For example, the activation component can be triggered by an enabling device 710, 805 (e.g., an RFID tag reader, an NFC module, etc.). Once activated, the activation component 1115 generates heat that is sufficient to indirectly cause the fuse 1120 to open. Activation components sufficient to generate the heat required to open the fuse 1120 include resistors. In some embodiments, the activation component 1115 includes multiple sub-components that work together to open the fuse 1120. For example, a first sub-component receives a signal from the enabling device 710, 805. As a consequence of receiving that signal, a second sub-component (e.g., a resistor) generates heat and causes the fuse 1120 to be opened.

In some embodiments that do not open a fuse to activate the battery pack 100, a flag can be set in the memory 235, 460, 650 of the controller 200, 400, 600, respectively. For example, the enable circuit 720, 815 monitors for the presence or absence of a magnetic field near an inventory control tag (e.g., a magnetic tag). When the inventory control tag is deactivated, the enable circuit 720, 815 detects the absence or removal of the magnetic field from the inventory control tag and signals to the controller 200, 400, 600 that a battery pack enable flag should be set in the memory 235, 460, 650. In some embodiments, the enable circuit 720, 815 receives a signal directly from an RFID tag reader or an NFC antenna that causes the enable circuit 720, 815 to signal to the controller 200, 400, 600 that a battery pack enable flag should be set in the memory 235, 460, 650.

Figure 13:
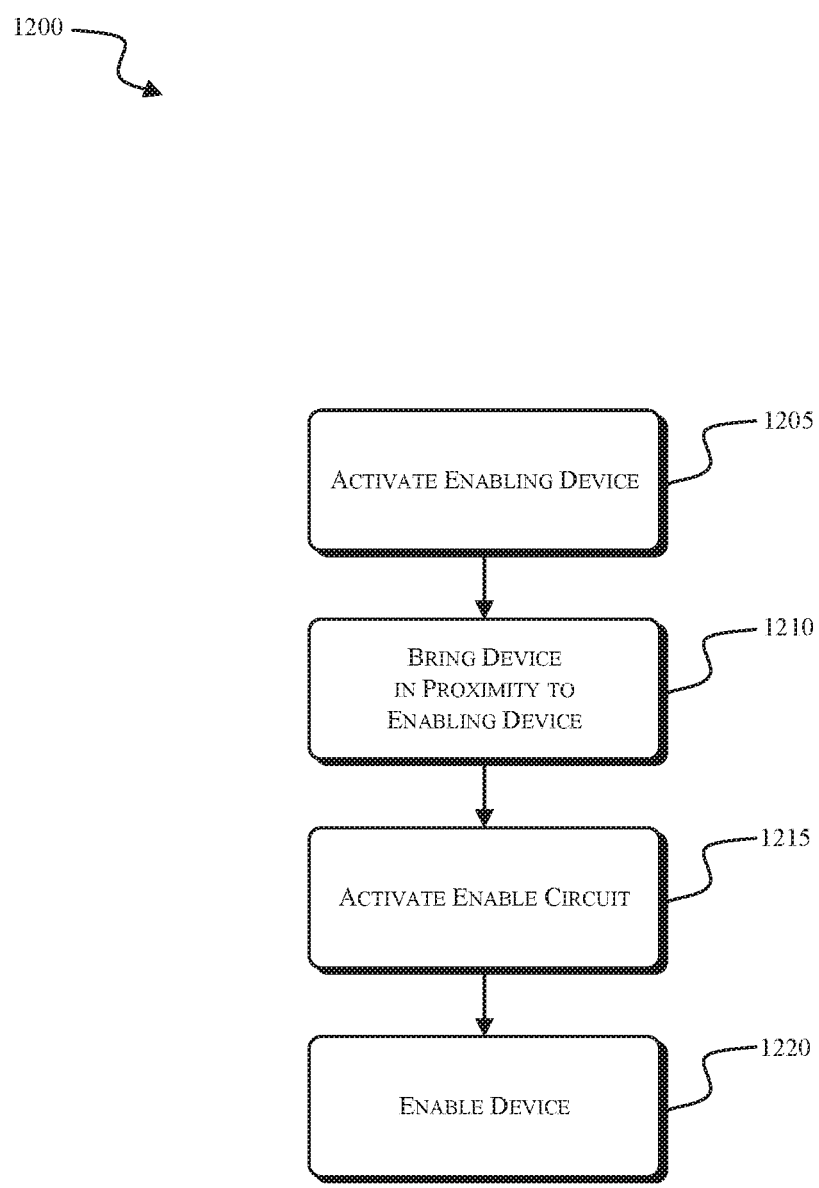
FIG. 13 is a process for enabling a device that includes an enable circuit, according to embodiments described herein.

FIG. 13 is a process 1200 for enabling the battery pack 100, power tool 300, charger 500, or another device. The process 1200 begins with activating an enabling device (assuming that the enabling device requires activating) (STEP 1205). Activating the enabling device can include, for example, activating or turning on a magnetic tag deactivation device, an RFID tag reader, or an NFC circuit. Activating or turning on the enabling device means that the enabling device is operable to perform its designated function (e.g., deactivating magnetic tags of products in a checkout line, reading an RFID tag, communicating using an NFC communications protocol, etc.). After the enabling device is activated at STEP 1205, the device is brought in proximity to the enabling device (STEP 1210). By bringing the device in proximity to the enabling device, the enable circuit is activated (STEP 1215). After the enable circuit is activated, the enable circuit causes the device to be enabled (STEP 1220). The device is then capable of being used.

In some embodiments, enabling devices are unable to fully activate device enable circuits. For example, battery packs, power tools, and battery pack chargers are often packaged and sold as kits. As a result, the combination of devices may be located within a large box or container, and enabling devices may lack the range necessary to activate the enable circuit of each device in the box or container. In these situations, the box or container can include a master activation component. The master activation component is able to directly or indirectly activate the activation components of the various enable circuits within the box or container.

In some embodiments, the master activation component is wired to the activation components of the enable circuits in the box or container. As a result, when the master activation component is activated by an enabling device, an enabling signal is transmitted by the master activation component to each of the enable circuits in the box or container. In other embodiments, the master activation component can transmit a wireless signal to the enable circuits after the master activation component is activated by the enabling device. The signal can be, for example, and RFID, NFC, or similar wireless signal. The wireless signal is operable to activate the activation component of each enable circuit in the box or container. In some embodiments, the master activation component includes a power source or retains residual energy such that, after individual devices are removed from the box or container, the master activation component can be used to individually enable each device within the box or container. The master activation component can enable the devices using any of the enabling techniques described herein.

Thus, embodiments described herein provide, among other things, devices that include an enable circuit. Various features and advantages are set forth in the following claims.

What is claimed is:

1. A device that includes an enable circuit, the device comprising:
   a housing;
   a controller located within the housing, the controller including a processing unit and a memory, the controller configured to selectively prevent the operation of the device; and
   the enable circuit located within the housing, the enable circuit configured to receive a signal related to enabling operation of the device,
   wherein the signal is operable to cause the device to change from a disabled state, during which the device is prevented from operating, to an enabled state, during which the device is permitted to operate;
   wherein the device is selected from a group consisting of: a battery pack, a power tool, and a charger.

2. The device of claim 1, wherein the signal is a near-field communication ("NFC") signal.

3. The device of claim 2, wherein the enable circuit includes an NFC circuit, and wherein a value associated with the signal is stored to a memory of the NFC circuit.

4. The device of claim 3, wherein:
   a second value is stored in the memory; and
   the controller is configured to compare the value and the second value and cause the device to change from the disabled state to an enabled state when the value matches the second value.

5. The device of claim 1, wherein:
the enable circuit includes an activation component and a fuse; and
the signal is operable to activate the activation component and open the fuse.

6. The device of claim 1, wherein:
the enable circuit is configured to receive a second signal related to disabling operation of the device; and
the second signal is operable to cause the device to change from the enabled state to the disabled state.

7. A system for enabling one or more devices, the system comprising:
an enabling device configured to generate a signal, the enabling device associated with a retailer; and
a device including:
a housing,
a controller located within the housing, the controller including a processing unit and a memory, the controller configured to selectively prevent the operation of the device, and
an enable circuit located within the housing, the enable circuit configured to receive the signal from the enabling device related to enabling operation of the device,
wherein the signal is operable to cause the device to change from a disabled state, during which the device is prevented from operating, to an enabled state, during which the device is permitted to operate;
wherein the device is selected from a group consisting of: a battery pack, a power tool, and a charger.

8. The system of claim 7, wherein the signal is a near-field communication ("NFC") signal.

9. The system of claim 8, wherein the enable circuit includes an NFC circuit, and wherein a value associated with the signal is stored to a memory of the NFC circuit.

10. The system of claim 9, wherein:
a second value is stored in the memory; and
the controller is configured to compare the value and the second value and cause the device to change from the disabled state to the enabled state when the value matches the second value.

11. The system of claim 7, further comprising:
a second device including:
a second housing,
a second controller located within the second housing, the second controller including a second processing unit and a second memory, the second controller configured to selectively prevent the operation of the second device, and
a second enable circuit located within the second housing, the second enable circuit configured to receive a second signal from the enabling device related to enabling operation of the second device,
wherein the second signal is operable to cause the second device to change from a disabled state, during which the second device is prevented from operating, to an enabled state, during which the second device is permitted to operate.

12. The system of claim 11, wherein the device and the second device are bundled together in a single box kit.

13. The system of claim 7, wherein:
the enable circuit is configured to receive a second signal from the enabling device related to disabling operation of the device; and
the second signal is operable to cause the device to change from the enabled state to the disabled state.

14. The system of claim 13, wherein:
the second signal is associated with the device being returned to the retailer.

15. A method of enabling a device that includes a housing, an enable circuit located within the housing, and a memory located within the housing, the method comprising:
activating an enabling device;
bringing the device in proximity to the enabling device; and
transmitting, from the enabling device, a signal to the enable circuit related to enabling operation of the device,
wherein the signal is operable to cause the device to change from a disabled state, during which the device is prevented from operating, to an enabled state, during which the device is permitted to operate;
wherein the device is selected from a group consisting of: a battery pack, a power tool, and a charger.

16. The method of claim 15, wherein the enabling device is a point-of-sale computer that includes a near-field communication ("NFC") circuit.

17. The method of claim 16, further comprising:
storing a value associated with the signal in an NFC memory of the NFC circuit.

18. The method of claim 17, further comprising:
comparing the value associated with the signal to a second value stored in the memory; and
when the value matches the second value, the device changes from the disabled state to the enabled state.

* * * * *